(12) United States Patent
Kaufmann et al.

(10) Patent No.: US 11,587,339 B2
(45) Date of Patent: Feb. 21, 2023

(54) METHOD FOR READING A CODE STORED IN A HALFTONE IMAGE AND COMPARISON WITH A RETRIEVABLE VALUE

(71) Applicant: Industry 365 UG (Haftungsbeschränkt), Chemnitz (DE)

(72) Inventors: Jörg Kaufmann, Chemnitz (DE); Frank Theeg, Chemnitz (DE); Holger Zellmer, Magdala (DE)

(73) Assignee: Industry 365 UG (Haftungsbeschränkt), Chemnitz (DE)

( * ) Notice: Subject to any disclaimer, the term of this patent is extended or adjusted under 35 U.S.C. 154(b) by 0 days.

(21) Appl. No.: 16/973,072

(22) PCT Filed: Jun. 22, 2019

(86) PCT No.: PCT/DE2019/100576
§ 371 (c)(1),
(2) Date: Dec. 8, 2020

(87) PCT Pub. No.: WO2020/001696
PCT Pub. Date: Jan. 2, 2020

(65) Prior Publication Data
US 2021/0248369 A1 Aug. 12, 2021

(30) Foreign Application Priority Data

Jun. 24, 2018 (DE) .......................... 102018115146.2

(51) Int. Cl.
*G06V 20/80* (2022.01)
*G06K 15/02* (2006.01)
(Continued)

(52) U.S. Cl.
CPC ......... *G06V 20/80* (2022.01); *G06K 15/1836* (2013.01); *G06K 15/1881* (2013.01);
(Continued)

(58) Field of Classification Search
CPC ....... G06V 20/80; G06V 20/95; B41M 3/146; B42D 25/305; B42D 25/333;
(Continued)

(56) References Cited

U.S. PATENT DOCUMENTS 7,394,573 B1 * 7/2008 Goldberg ........... H04N 1/32261
358/1.15
10,261,846 B1 * 4/2019 Patton ..................... G06F 9/542
(Continued)

FOREIGN PATENT DOCUMENTS

| CN | 1234521 A | 11/1999 |
|---|---|---|
| CN | 104115480 A | 10/2014 |

(Continued)

*Primary Examiner* — Christopher Wait
(74) *Attorney, Agent, or Firm* — Michael Soderman (57) ABSTRACT

A method for checking the authenticity of products, by checking an image (A) of a product. The proof of authenticity is not visible to the human eye and cannot be copied. This is characterized in that a code stored in a halftone image by manipulation of dots and/or a manipulated field bounded in the halftone image can be read by means of an optical device and compared with a retrievable value in at least one database. In at least one field (F1 to F5) a part of a serial number is determined which describes the structure of the serial number and a hash function used for transmitting the serial number to the database, and this is also characterized in that the serial number is subsequently assembled and encrypted with the corresponding hash function.

6 Claims, 2 Drawing Sheets

(51) Int. Cl.
*H04L 9/32* (2006.01)
*H04N 1/32* (2006.01)
*H04N 1/00* (2006.01)
*G06V 20/00* (2022.01)
*H04L 9/00* (2022.01)

(52) U.S. Cl.
CPC ......... *H04L 9/3278* (2013.01); *H04N 1/0087* (2013.01); *H04N 1/00838* (2013.01); *H04N 1/32251* (2013.01); *H04N 1/32256* (2013.01); *H04N 1/32272* (2013.01); *H04N 1/32352* (2013.01); *G06T 2201/0051* (2013.01); *G06V 20/95* (2022.01); *H04L 9/50* (2022.05); *H04N 2201/3235* (2013.01); *H04N 2201/3281* (2013.01)

(58) Field of Classification Search
CPC .. B42D 25/342; B42D 25/29; G06K 15/1836; G06K 15/1881; H04L 9/3278; H04L 2209/38; H04N 1/32251; H04N 1/32352; G06T 2201/0051; G07D 7/005; G07D 7/0055; G07D 7/2008; G07D 7/2033; G07D 7/0047

See application file for complete search history.

(56) References Cited

U.S. PATENT DOCUMENTS

| | | |
|---|---|---|
| 2013/0314468 A1 | 11/2013 | Jimenez |
| 2013/0314486 A1 | 11/2013 | Goldau et al. |
| 2015/0036890 A1* | 2/2015 | Biro ................. G06K 19/06037 235/494 |
| 2017/0006182 A1* | 1/2017 | Marinkin ........... H04N 1/32256 |
| 2018/0276364 A1* | 9/2018 | Rowe ..................... B42D 25/43 |

FOREIGN PATENT DOCUMENTS

| | | | |
|---|---|---|---|
| CN | 106407795 A * | 2/2017 | ............. G06F 21/45 |
| WO | 03007252 A1 | 1/2003 | |
| WO | 200511920 A1 | 11/2005 | |
| WO | 2017137155 A1 | 8/2017 | |

* cited by examiner

METHOD FOR READING A CODE STORED IN A HALFTONE IMAGE AND COMPARISON WITH A RETRIEVABLE VALUE

CROSS REFERENCE TO RELATED APPLICATIONS

This application is the U.S. national stage of International Application No. PCT/DE2019/100576, filed on 2019, Jun. 22. The international application claims the priority of DE 102018115146.2 filed on 2018, Jun. 24; all applications are incorporated by reference herein in their entirety.

BACKGROUND

The invention relates to a method for checking the authenticity of products based on the comparison of dissimilar information as well as printed images according to the preamble of the first and ninth patent claims.

Various objects of daily life such as branded products, items of clothing, documents, machine elements, food as well as value and identification documents are affected by counterfeiting and product piracy.

There are several prior-art solutions to prove the authenticity of products and to fight product piracy. Mostly barcodes, QR codes or RFIDs or NFCs are used for this purpose.

Besides the proof of originality of products by means of RFID or NFC, barcodes and QR codes, there are also visual marks such as holograms or laser engravings. Here, however, the proof of authenticity is usually only based on subjective recognition. The customer must decide for himself on the basis of trust whether the product, document or security is an original. This problem also exists when evaluating the authenticity of banknotes, which can only be analyzed for authenticity with additional technical applications. These disadvantages are avoided, for example, by DE 601 22 293 T2, which introduces magnetic markings into textile or leather products. These non-visible markings are firmly combined with the product and remain there for the entire product life. For this purpose, amorphous ferromagnetic fibers are used, which are implemented in the respective article by textile technology. A disadvantage of this solution is the possibility of imitation by identical incorporation of corresponding materials into such textiles or products. In addition, the metrological proof of authenticity is very complex, costly and therefore not very economical.

In the publication DE 101 18 679 A1, a method has been created to reduce the effort required for the insertion and verification of the security features. Ferromagnetic resonance active substances are used for marking. The marker substance is either mixed into the product or combined with the product. By means of a special scanner the ferromagnetic substance is then measured and a statement about the authenticity of the product is made on the basis of the measurement results. By using different marker substances and attaching the substances at different places, a marking code can be created. This code can then be used to store further information on product or production process parameters. The disadvantage of this method is the high effort for the encryption of the information and the attachment of the code to the products. In addition, the respective coding points must be known when decoding the code and measuring and scanning devices specially suited for this application must be available.

The publication WO 03/007252 A1 describes a method in which a uniquely assigned random code is used to prove originality. This code is applied to the product or the corresponding packaging and stored in a central database. This central database is accessible via the internet and the customer can enter the corresponding code in an online mask after purchasing a product and thus inquire about the authenticity of the product. If the entered code is not contained in the database, it is a fake. If the code exists in the database and if the code has already been queried before, it is not possible to prove unequivocally which product is the original and whether the product was queried twice. A counterfeit of the product including the code cannot be excluded.

A more cost-effective solution for implementing copy protection is disclosed in the publication DE 10 2013 019 675 B3. This publication relates to a method for the acquisition and reproduction of information which is applied to the surface of information carriers of advertising and/or information media by means of display elements. The purpose of the invention is to enable digital communication by means of data elements on information carriers. For this purpose, representation elements of a textual and/or pictorial overall representation are recorded by means of a scanner and an encrypted connection code is decoded. On the basis of this connection code, the access to a database and the comparison of the identical existing physical information with the identical information in a database takes place. The disadvantage of this solution is that by copying the physical information and attaching it to a counterfeit product, the counterfeit product is recognized as original.

DE 10 2015 009 123 A1 publishes a method for checking the authenticity of the designation of origin and shelf-life indications of products. According to this teaching, a design surface with an individual security code and a mark is applied to the product. The individual security code can be decoded by a scanner. Afterwards a data connection to a database is established. In the database, the information on the mark and code is compared and a query code based on a mathematical formula is transmitted to the scanning device. Only if the mark, code and query code match, an original product is present. In order to prevent the generation of a fake, the scan code is renewed with every scan, so that only the scanning device that made the last scan knows the current scan code. The disadvantage of this solution is that the scan code must be transmitted separately from the original product. If the scan code is lost, the originality of the product can no longer be proven.

The publication DE 10 2015 006 008 A1 relates to an invention of a method for checking the authenticity of security features on printed and 3D value objects such as checks, vouchers and certificates. In this process, the security of the detection of forgeries is to be significantly increased above the level of the patents known from the prior art. In the first step, the value object is identified and it is defined where the security features are located on this value object. Afterwards, the two- and three-dimensional security features on the object are recorded by a camera. The determined values are then sent to a comparison station. The comparison station compares the detected features with the stored features. The comparison result is then sent back to the scanning device and a statement is made about the authenticity of the object. It is essential that the data is transmitted in encrypted form using a hash function and that at least one 3D security feature is attached to the value object. The procedure of this method is provided in several steps:

1. The edges of the value object are detected by means of the auto focus function. Afterwards, the optical elements within the edges (boundary surfaces) of the value object are captured and recorded in two dimensions. Afterwards, the display elements with security features are selected using predefined surfaces and patterns.
2. The selected features are compared with the stored values.
3. By moving the camera relative to the value object, several angles of the 3D features are recorded and detected.
4. The detected values are then compared with the security features in a comparison station.

The increase in security according to this publication is based on a code, which is produced by means of a coding device and to which value objects are additionally attached. This code is, for example, the serial number of the value object. The transmission of the code between the scanning device and the comparison station is carried out by means of another coding based on a hash function, so that the code cannot be counted back. In the comparison station, the value stored there by means of the identical hash function is then compared with the scanned value that is available as a hash value.

WO 2017/137155A1 describes a method for the verification of an object provided with a security feature, wherein the security element is manufactured in a multi-step process with register variations. For the register variation a superposition of at least two dot or line grids is used. The resulting moiré grids are used to determine a check value which is compared with a reference value for verification. Preferably, several printing processes are used and check digits are stored in selected areas. In the case of grid manipulation, the creation of moiré structures, which can be read out optically, is used. The grid manipulation is realized by register variations at the printing press and is unavoidable due to the proposed use of different printing processes and serves as a kind of fingerprint to prove the authenticity of the respective print products. To prove authenticity, the banknote to be verified is photographed using a mobile computer device and a corresponding program (application). The serial number is then digitized by means of OCR recognition and the minimum and maximum distances of the register shift are used to determine the moiré grid and from this the check value of the banknote. The app then establishes a connection to a database and transfers the serial number and the check value to the database. In the database, the check value and the serial number are compared and the result of the test is transmitted back to the app, which displays the result of the authenticity check accordingly. It is also suggested to further secure the system by applying an additional barcode.

From the publication DE 10 2008 034 022 A1, a method is known for the production of security elements in an image which are invisible to the human eye and cannot be copied, in particular for checking the authenticity of images, wherein the image is reproduced by means of a halftone image. A solution, dispersion, emulsion or paste containing the luminescent substance and at least one binder is printed. With this solution, defined and predetermined patterns are to be generated by specific modification of the luminescence in partial areas of the marking layer, thus eliminating the need to determine a previously generated pattern for the purpose of determining the correlated character sequence. The change of the partial areas of the marking layer under illumination with visible light and in daylight intensity should not be perceptible with the human eye, but only determined with the help of technical aids, such as magnifying glasses, detectors, etc. In this process, a laser sweeps over the partial areas shown in a predetermined path, which in turn are determined by the predetermined path of the laser beam. Local pyrolysis occurs in the partial areas due to the strong absorption of the laser radiation in the laser-sensitive pigment and its immediate surroundings (diameter up to 10 µm around the center of a laser-sensitive pigment). This reduces the permittivity in the immediate vicinity of a laser-sensitive pigment with the result that an electroluminophore in this vicinity can no longer be excited to luminescence by an alternating electric field of the same frequency and intensity. As a result, the partial areas show a reduced electroluminescence compared to the other areas. Due to the control of the laser, the pyrolysis is locally limited as described, so that the pyrolyzed areas are practically imperceptible in normal daylight and with the human eye without technical aids.

In this solution, a chemical change of the printed layer is thus carried out in partial areas after printing by means of a laser.

In US 2013/0314 468 A1, modification is carried out by laser after printing.

The two solutions mentioned above mean a high additional expenditure by processing by means of a laser at high investment costs by the necessary laser.

The publication DE 10 2013 107 951A1 describes a method for verifying the authenticity of a document using at least one piece of additional information, wherein the document has an information feature that refers to the additional information. An image of the document is recorded, the information feature in the recorded image is recorded, the additional information is determined on the basis of the recorded information feature and the recorded image is displayed together with the additional information in order to verify the authenticity of the document.

This solution is not suitable for identifying products by their serial number.

SUMMARY

The invention involves a method for checking the authenticity of products, by checking an image (A) of a product. The proof of authenticity is not visible to the human eye and cannot be copied. This is characterized in that a code stored in a halftone image by manipulation of dots and/or a manipulated field bounded in the halftone image can be read by means of an optical device and compared with a retrievable value in at least one database. In at least one field (F1 to F5) a part of a serial number is determined which describes the structure of the serial number and a hash function used for transmitting the serial number to the database, and this is also characterized in that the serial number is subsequently assembled and encrypted with the corresponding hash function.

DETAILED DESCRIPTION

It is the object of the invention to develop a method for checking the authenticity of products based on the comparison of dissimilar information as well as printed images that guarantee a reliable statement about the authenticity of a product.

This object is solved with the characteristic features of the first and ninth claims.

Advantageous designs result from the subclaims.

In the method for the production of security elements in an image which are not visible to the human eye and cannot be copied, for the authenticity check of the image, the image is reproduced by means of a halftone image, wherein the halftone image consists of individual dots and, according to the invention, at least one field is defined in the image/halftone image, wherein, by means of manipulation of dots in the field and/or by means of manipulation of the entire field, encrypted information that cannot be copied is stored for comparison with at least one database and a serial number is represented by means of contours introduced into the halftone image, wherein each contour is assigned a digit of the serial number and wherein the serial number can be represented in any desired numerical system.

The image can be in the form of a company logo or as a supplementary representation.

The invention therefore relates to a system for the authentication of objects, wherein both the verification procedure and associated computer products for carrying out the authentication and the necessary security elements are provided with the objects to be secured.

Various objects of daily life such as branded products, clothing, documents, machine elements, food as well as value and identification documents are provided with a non-copyable security element. This means that the objects are uniquely identifiable and can no longer be duplicated or copied without permission. In the event of an attempted forgery, the security element is falsified and is no longer recognizable.

In the prior art, elaborate testing equipment is used for such authentication tests with already known security elements. For a simple and market-penetrating application, however, it is necessary that such authentication can be carried out easily and by anyone. For this purpose, the use of a cell phone connected to the internet and its camera is an optimal solution. Alternatively, similar products such as a digital camera, handheld, pads or similar with an internet connection can be used.

An authentication procedure is used, which is a multi-step procedure that optically encrypts an at least binary serial number in an image by varying the screening of full and halftone areas in previously defined regions.

The image is produced using duplex, four- or multi-color printing or hexachrome printing, letterpress, gravure, planographic printing, through-printing, non-impact printing, 3D printing or a combination of at least two printing processes. For example, if 3D printing is layered, individual layers and/or partial areas may have a different structure, orientation or shape in the form of fields, which are used to store information for comparison with a database.

In the first step of the method, a graphic available as an RGB file or in another color space is rasterized in the RIP process to preferably 4 colors (C—Cyan, M—Magenta, Y—Yellow, K—Black). In the case of a single-color display, it is also sufficient to rasterize one color (for example, C or special colors such as G—Green). In addition, other special colors such as UV and IR colors (UV=ultraviolet IR=infrared; light in this spectral range cannot be recognized by the human eye) can also be used. In certain areas, however, detection via digital cameras (either directly or indirectly via a change in intensity in the RGB channels) is detectable. Alternatively, special colors, lacquers, luminescent colors or electromagnetically reacting colors can be used as a substitute or supplementary color component, wherein the maximum number is not limited.

After rasterization, in a second step, areas are defined for the optical application of a random or arbitrary serial number. The contour and size of the areas is completely free and can consist of circles and/or triangles, rectangles, trapeziums, squares, various polygons or freeform surfaces. Each area stands for one digit of the serial number. Which area stands for which position of the serial number is displayed in previously defined areas and the part of the serial number shown there. For this purpose, the sequence in which the individual digits of the serial number are merged and the hash function used for encryption is determined over at least one defined area by means of the parameters grid change and/or contour.

EX:

102 (from F1, F2, F3)=Sequence F1, F2, F3, F4, F5 and hash function alpha 001 (from F1, F2, F3)=Sequence F2, F2, F1, F4, F5 and hash function gamma 013 (from F1, F2, F3)=Sequence F5, F2, F1, F3, F4 and hash function alpha In the third step the information of the serial number is displayed, which is binary in the preferred variant, i.e. the ranges can assume two states:

Grid inside a field is identical to grid outside a field or the area inside the field and outside differ. One of these states is defined in the binary procedure with a 0 (false), one state with a 1 (true). In the preferred case, the halftone angle of two of the four colors (CMYK) is partially exchanged. However, it is also possible to allow several variation states of the grids and thus to arrive at a quaternary, decimal or hexadecimal code, for example. Possible variations and/or combinations for modifying the halftone are Exchange of the halftone angle between two or more colors Change of the halftone angle of at least one color Change of the running width or halftone frequency of the cross-line halftone of at least one color Change of frequency for frequency-modulated halftones of at least one color Change of amplitude for amplitude-modulated halftones of at least one color Change of frequency for amplitude-modulated halftones of at least one color Change of amplitude for frequency-modulated halftones of at least one color Change of the surface area of dots of at least one color Change of the contour of the dots of at least one color Addition of at least one color (IR, UV or other special color or lacquer)

Exchange of at least one of the colors CMYK with another color (IR, UV or other special color or lacquer)

Replacing the color tones achieved by subtractive color mixing of the process colors with at least one special color or spot color Change of the achromatic structure by replacing equal parts of the process colors CMY completely or partially with black (K) and/or an additional black tone Change of the color composition when printing with more than four process colors, for example in hexachrome printing. For example, by replacing C and Y components with the process color G.

In the fourth step, the modified graphic is printed using a printing process such as ink jet, laser, offset, gravure, flexo, screen printing or similar, or other digital or analog printing techniques. The printing substrate can be chosen at will and ranges from paper to plastics and other natural materials such as wood, stone or artificially produced substrates. The form of the printing substrate is also freely selectable and ranges from thread-like structures such as yarns to 2D-structures like paper and foils to 3D structures like parts and components. This means that the manipulated CMYK data (preferably with partially exchanged K and M halftones) or correspondingly otherwise manipulated data sets in different color spaces or color combinations with further color combinations are sent to the printing device instead of the usual CMYK data created and screened from the print data or corresponding data sets in different color spaces with further color combinations.

The encryption and storage of the serial number takes place in parallel or at a later time to steps 1-4. For this purpose, in step 5 the at least binary serial number is transformed using a hash function. Which hash function is used was defined in step 2 and is part of the serial number. The at least one binary serial number and the transformed information (hash value) are then stored in at least one database and assigned to a container with a further serial number and supplemented by further product data (brand, name, production location, production time, size, color, text length, etc.).

In step 6 the container is filled. For this purpose, step 5 is carried out at least once. Preferably, however, this is carried out much more often, for example in the range of 4 k to 20 k, wherein there is no maximum number.

If the container is filled with hash values, the container itself is encrypted or transformed in a step 7. The so-called Merkle tree procedure is used here, i.e. two hash values of a serial number are always transformed with a defined hash function to a new hash value and thus combined. The resulting new hash value is stored in the database and then two already combined hash values of serial numbers are transformed again with a hash function (identical or changed). This step is repeated until a single hash value is available for the whole container. The encryption path and the hash functions used are also stored in the database and a so-called Merkle path of the container is created.

In an eighth step, this final hash value of the container is written to at least one blockchain (preferably a public blockchain). With this step, the unalterable storage of the container hash value is completed and each person can publicly read out which hash values exist from the container. Since the hash functions represent an asymmetric encryption and thus a transformation, it is not possible to infer from the publicly available container hash values the combined hash values of the Merkle tree or the hash values of the serial numbers or the respective serial numbers per se.

According to the invention, to prove the authenticity of products, the security feature printed in step 4 is recorded with a mobile device, such as a cell phone, camera, tablet, SmartWatch or similar, and further processed in respect of data processing in step 9. In the preferred variant, a cell phone is used for this purpose on which a special application (software) is installed or integrated into the firmware of the cell phone.

To prove authenticity, the app is opened or the camera function with integrated app is started and the security element is recorded in the form of a security feature. If the camera with integrated app is active in standby mode, it is sufficient for the camera to automatically detect the presence of a security feature.

After the security feature has been recognized, the RGB image is further processed in step 9a, i.e. a combination of color filters and transformations, such as Fourier transformations, is applied to determine the information content for each individual field of the security feature. In the binary case this is a 0 or 1 or true and false.

In step 9b), the first part of the serial number is determined in at least one field, which describes the structure of the serial number and the hash function used to transfer the serial number to the database.

Then, in step 9c, the serial number is composed according to step 9b and encrypted with the corresponding hash function in step 9d.

In the following step 9e, the transformed serial number is sent to the database and the Merkle path stored for this hash value is determined according to step 9f. The database consists either of a server accessible via the internet or of a combination of several servers or autonomously operating nodes (nods). The corresponding container hash is determined by the Merkle tree procedure in a step 9g.

In step 9h, the comparison with at least one blockchain is carried out, wherein it is checked whether the determined container hash is present there.

If the container hash is not present, the product is counterfeit and a corresponding error message is transmitted to the mobile device, which outputs this optically and/or acoustically (step 9h case 1).

If the container hash is contained in the blockchain, the information: "Product is genuine" is transmitted to the mobile device and this is displayed visually and/or acoustically. In an advantageous design, additional product parameters such as production date, production location, size, color, etc. are read from the database and transmitted to the mobile device as additional information (step 9h case 2).

The customer can now make a visual comparison with the product. If the data transmitted from the database does not match the product in question, this is a $2^{nd}$ order counterfeit. The customer can report this via the application on the mobile device (step 9h case 3).

In addition to the transmission of the code to the database according to step 9e, time and geodata (coordinates) are also transmitted to the database and stored. Software is used to check in the background whether it is theoretically possible that the data associated with a product can be genuine. For example, if a product is scanned in Hamburg at 9:35 a.m. on Nov. 11, 2035 and 4 minutes later in Los Angeles, there is a 100% probability of a $3^{rd}$ order counterfeit. This is also transmitted to the user and indicated visually and/or acoustically (step 9h case 4).

In the cases of $1^{st}$ to $3^{rd}$ order counterfeits, the customer has the possibility to take a photo of the product in its entirety after detection in a $10^{th}$ step and enter it into a database via the mobile application. On the basis of this data a corresponding further processing is then carried out.

By exchanging the halftone angles of the colors black and magenta, the number of halftone dots in the areas of variation is identical to the other areas. The subtractive color mixing in the CMYK color space in combination with the max. resolution of the human eye leads to the fact that the exchange of the rasterization is not recognized. Furthermore, there is a multitude of other manipulations such as

- change of the halftone angle in the range of e.g. +/−0.1° to +/−10°;
- change of the running width or halftone frequency of the cross-line halftone in the range of, for example, +/−0.1% to +/−20%;
- change of frequency for frequency-modulated halftones in the range of e.g. +/−0.1% to +/−20%;
- change of amplitude for amplitude-modulated halftones in the range of e.g. +/−0.1% to +/−20%;
- change of frequency for amplitude-modulated halftone in the range of e.g. +/−0.1% to +/−20;
- change of amplitude for frequency-modulated halftones in the range of e.g. +/−0.1% to +/−20%;

change of the area content of the dots in the range of e.g. +/−0.1% to +/−20%;

change of the contour of the dots;

addition of colors (IR, UV or other special color or lacquer);

exchange of colors CMYK with other colors (IR, UV or other special color or lacquer);

replacing the color tones achieved by subtractive color mixing of process colors with special color(s) or spot color(s);

changing the achromatic structure by replacing equal parts of the process colors CMY completely or partially with black (K) and/or an additional black tone;

changing the color composition when printing with more than four process colors, for example in hexachrome printing. For example, by replacing C and Y components with the process color G;

which also cannot be perceived by the human eye.

In the event of an attempted forgery, the CMYK data is scanned or otherwise digitized and transformed into the RGB color space. The merging, shifting and/or combination of different halftone dots of different printing colors into dots during this transformation leads to an unreproducible change in the optically encoded image of the line number, which is significantly enhanced by the application of compression techniques such as JPEG image formats or similar. As a result, the optically encrypted information in the image is deleted and it is not possible to convert it back into the identical CMYK data. Although reprinting results in images that appear identical or similar to the human eye, the decoding process based on filter applications and transformations cannot recognize the serial number. The reason for the non-recognition is the presence of other information in the security-relevant areas.

The information present in the CMYK (or other color spaces described above) can only be recognized or decoded by filtering (R G and/or B in different ranges of light wavelengths up to the IR or UV range, optionally using additional light sources such as flash or other light sources of the mobile application) in combination with Fourier transformations. However, a printing of the data is not possible on the basis of this filtered and Fourier-transformed information, because only information 0 or 1 is available for the respective ranges.

The following is an example of how to compare the information:

1. A random number is generated. This random number is preferably binary, but can also be of a different type. EX: 010010 and represents the serial number (1). In addition, serial number (1) is written into a database 1 (DB1) and combined there with further product and/or production process data or a link to a manufacturer database is established via an API or other interfaces.
2. A hash function A.1 is used to transform the serial number (1) into a hash value (2). EX: from 010010 results 2FX3D. DB1 stores that serial number (1) was transformed with A.1 (if only one hash is used in the whole system, this information can be omitted).
3. A container with a random ID (3) is created. EX: 011001. In DB1 it is checked whether the ID already exists, if so, a new number is generated.
4. The container with the random ID (3) is filled with hashed product codes 2FX3D, etc. Also when creating each new product serial number (1), DB1 checks if it already exists. If yes, then a new serial number (1) is created and a new check is made to see if the serial number (1) exists in DB1.
5. A hash function A.2 is applied to the entire container (3) or two hash values of the serial numbers are always combined by means of a hash function to a further hash value until a final container hash (4) EX: X3YAO is created. This ID (4) is written into a blockchain.
6. The resulting Merkle path is stored in DB1.
7. The serial number (1) is applied to a product and read in by means of a scan app. EX: 010010
8. In the app, the serial number is converted using a recognized hash function. EX: 010010→2FX3D
9. The corresponding Merkle path is retrieved from DB1 and the container hash is determined using the hash value of the serial number (1) 2FX3D and Merkle path X3YAO.
10. The app searches the at least one blockchain for the container hash X3YAO. If this value is stored in the blockchain, the serial number (1) 2FX3D is also part of the original container and real.

Alternatively, step 7 can be followed by steps 8a to 10a:

8a) App connects to DB1 and sends hash value of serial number (2) to DB1

9a) DB1 calculates the container hash based on (2) and the Merkle path (4)

10a) DB1 checks if container hash is available in blockchain

11a) If yes, then transfer the information "Product is genuine" to mobile device. If no, then the information "Product is counterfeit" is transmitted to the mobile device.

Procedure for coding:

a) Rasterization of a graphic in the RGB color space (or another color space) in a hardware or software raster image process (RIP) into a CMYK halftone or into another printable color space consisting of more or less colors b) Determination of the optical coding of the serial number, including:
  a. Determination of the coding areas
  b. Determination of the outer contours of the coding
  c. Determination of the sequence in which the areas are arranged in sequence for coding
  d. Determination of the hash function for the transformation of the serial number (1)

Creating the serial number (1.1) for the implementation in the graphic d) Change of the rasterization according to the coding information of the serial number (1.1)

e) Printing the information.

Procedure for scanning and decoding a) Recording of the print image (CMYK or other printable color space)

b) After recording, the data is available in the RGB color space or in another color space recognizable by optical systems such as camera systems c) Application of filters and Fourier transformation d) Recognizing of fields/areas if there is information 0 or 1 (binary case) per code field and reading of the serial number (1.1). If halftones for several colors are varied or several variation possibilities are used, one value can be assumed for each color or variation. For all CMYK then for example B. 0,1,2,3 when using special colors, further information states can be assumed for each special color.

e) Comparison with DB1 in which fields the information for the optical decoding (field contour, sequence and hash function) for serial number (1.1) is located f) Determination of the decoding value g) Determination of the serial number (1) and transformation of the serial number (1) using the corresponding hash function h) Further processing of the hash value of the serial number (2).

The database DB1 is at least one database, at least one cloud and/or at least one blockchain in which the relevant information is stored completely, split and/or encrypted or open. The information in DB1 can also provide links to other databases, clouds, blockchains, etc. from which information can be obtained via APIs or other interfaces.

BRIEF DESCRIPTION OF THE DRAWINGS

The invention is explained in more detail in the following by reference to an exemplary embodiment and associated drawings, wherein.

DETAILED DESCRIPTION OF THE PREFERRED EMBODIMENTS

Figure 1:
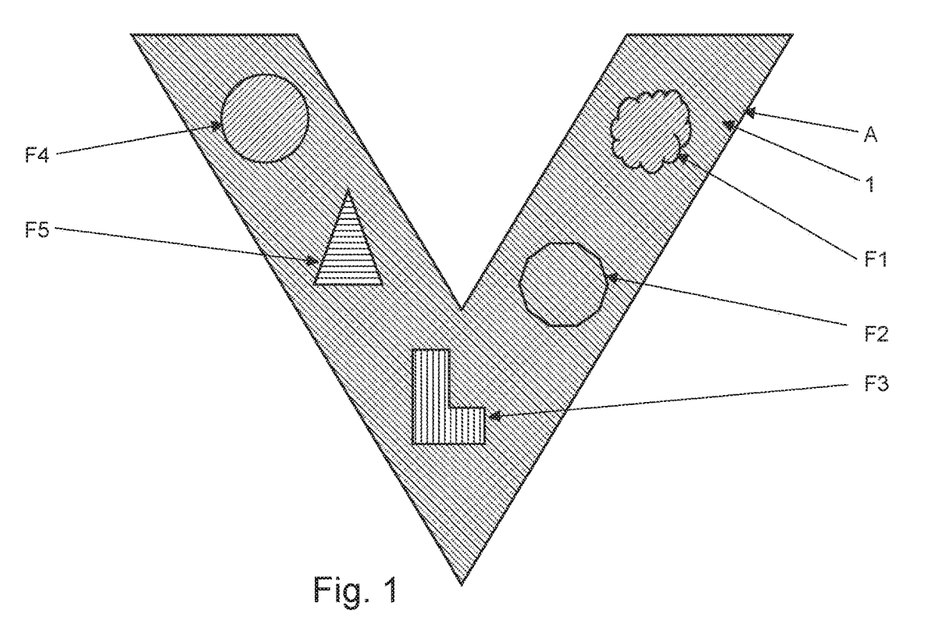
FIG. 1 shows a schematic representation of an image.

FIG. 1 shows a schematic image A with a dot grid 1. To improve the display, lines arranged in parallel as halftone image have been used in the illustration for better representation. However, the halftone image consists of dots which are arranged next to each other. The image shows 5 fields F1 to F5, wherein each field F1 to F5 has any geometrical shape or free form.

By means of the fields F1 to F5, information can be displayed in image A. The human eye cannot recognize differences and does not perceive any fields in image A.

The fields F1, F3, F4 and F5 show a different orientation of the halftone image compared to image A. Field F2 has the same orientation of the halftone image as the halftone image of image A.

From the orientation of the dots a binary representation can be generated in such a way that in case of a deviating orientation of the dots of the field F compared to the image A, a 1 or a 0 can be generated, depending on the previous definition. In case a deviation generates a 1, this means that the field F2 generates a 0 and the fields F1, F3, F4 and F5 generate a 1, whereby a serial number can be represented binary. Beside the value 1, the fields F3 and F4 can assume the values 2 and 3 respectively, due to the further modification.

Figure 2:
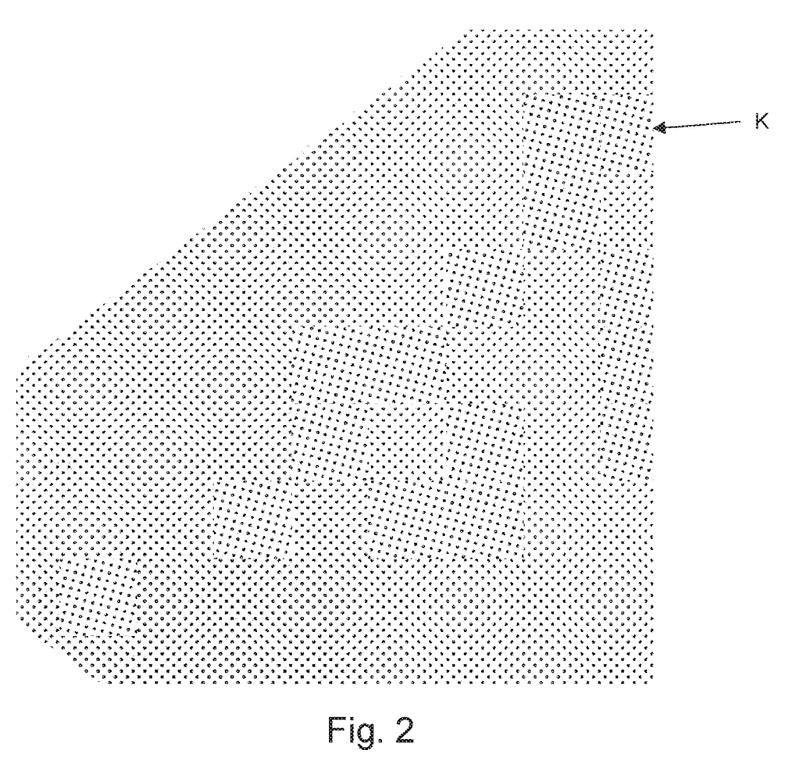
FIG. 2 shows a rotated halftone angle in the color black.
Figure 3:
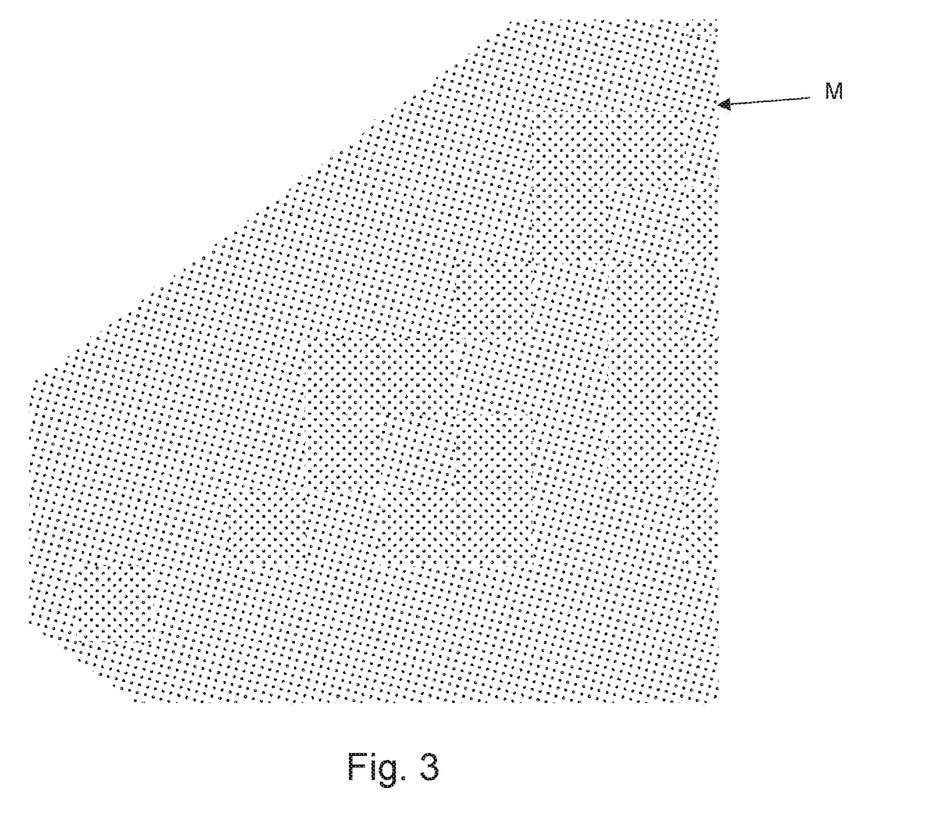
FIG. 3 shows a rotated halftone angle in the color magenta.

A preferred case is the use of 4 colors CMYK and display of the serial number in the halftones for the colors black (K) according to FIG. 2 and magenta (M) according to FIG. 3, with the halftone angles swapped between K and M in selected areas.

The invention claimed is:

1. A method for checking the authenticity of products, by checking an image (A) of a product, wherein the proof of authenticity is not visible to the human eye and cannot be copied, characterized in that a code stored in a halftone image by manipulation of dots and/or a manipulated field bounded in the halftone image can be read by means of an optical device and compared with a retrievable value in at least one database, wherein in at least one field (F1 to F5) a part of a serial number is determined which describes the structure of the serial number and a hash function used for transmitting the serial number to the database, and in that the serial number is subsequently assembled and encrypted with the corresponding hash function, wherein the encrypted serial number is sent to the database and a Merkle path stored for this hash value is determined, wherein an associated container hash is determined via the Merle tree method, and wherein the sequence for coding is as follows:
  a) rasterization of a graphic in RGB color space (or another color space) in a hardware or software raster image process (RIP) into a CMYK halftone or into another printable color space consisting, of more or less colors
  b) determination of the optical coding of the serial number, including:
    a. Definition of the areas for coding;
    b. Definition of the outer contours of the coding:
    c. Determination of the sequence in which the areas are arranged in sequence for coding;
    d. Determination of the hash function for the transformation of the serial number (1):
  c) creation of the serial number (1.1) for the implementation into the graphic;
  d) change the rasterization according to the coding information of the serial number (1.1);
  e) printing the information;

and in that the sequence of scanning and decoding is as follows;
  i) recording of the print image (CMYK or other printable color space);
  j) after recording, the data is available in the RGB colors ace or in another color space recognizable by optical systems such as camera systems;
  k) application of filters and Fourier transformation;
  l) recognition of fields/areas if there is information 0 or 1 (binary case) per code field and reading of the serial number (1.1), wherein in case of variation of the halftones for several colors or in case of using severel variation possibilities per color or for each variation a value is assumed, for all CMYK then e.g. 0.1.2.3 and in case of using special colors further information states per special color;
  m) comparison with DB1 in which fields the information for the optical decoding (field contour, sequence and hash function) for serial number (1.1) is located;
  n) determination of the decoding value;
  o) determination of the serial number (1) and transformation of the serial number (1) using the corresponding hash function;
  p) further processing of the hash value of the serial number (2); and in that the database DB1 is at least one database, at least one cloud and/or at least one blockchain in which the relevant information is stored completely, split and/or encrypted or openly, wherein the information in DB1 can also represent links to further databases, clouds, blockchains from which information can be obtained via APls or further interfaces.

2. The method according to claim 1, characterized in that the proof of authenticity in the form of a security element is recorded with a camera using a mobile device and processed further in terms of data technology by means of an application which is installed and/or integrated in the firmware.

3. The method according to claim 1, characterized In that after the recognition of the security element; the recording is present in an RGB format and is further processed in terms of data technology, wherein a combination of color filters and transformations is applied in such a way that the information content is determined for each individual field of the security element.

4. The method according to claim 1, characterized in that a comparison with at least one blockchain is carried out, wherein a check is made whether the determined container hash is present in the database.

5. The method according to claim 1, characterized in that an evaluation of the authenticity of the scanned image can be displayed by means of the application.

6. The method according to claim 1, characterized in that a forgery of first to third order is recognizable by reference to geodata and time.

* * * * *